UNITED STATES PATENT OFFICE.

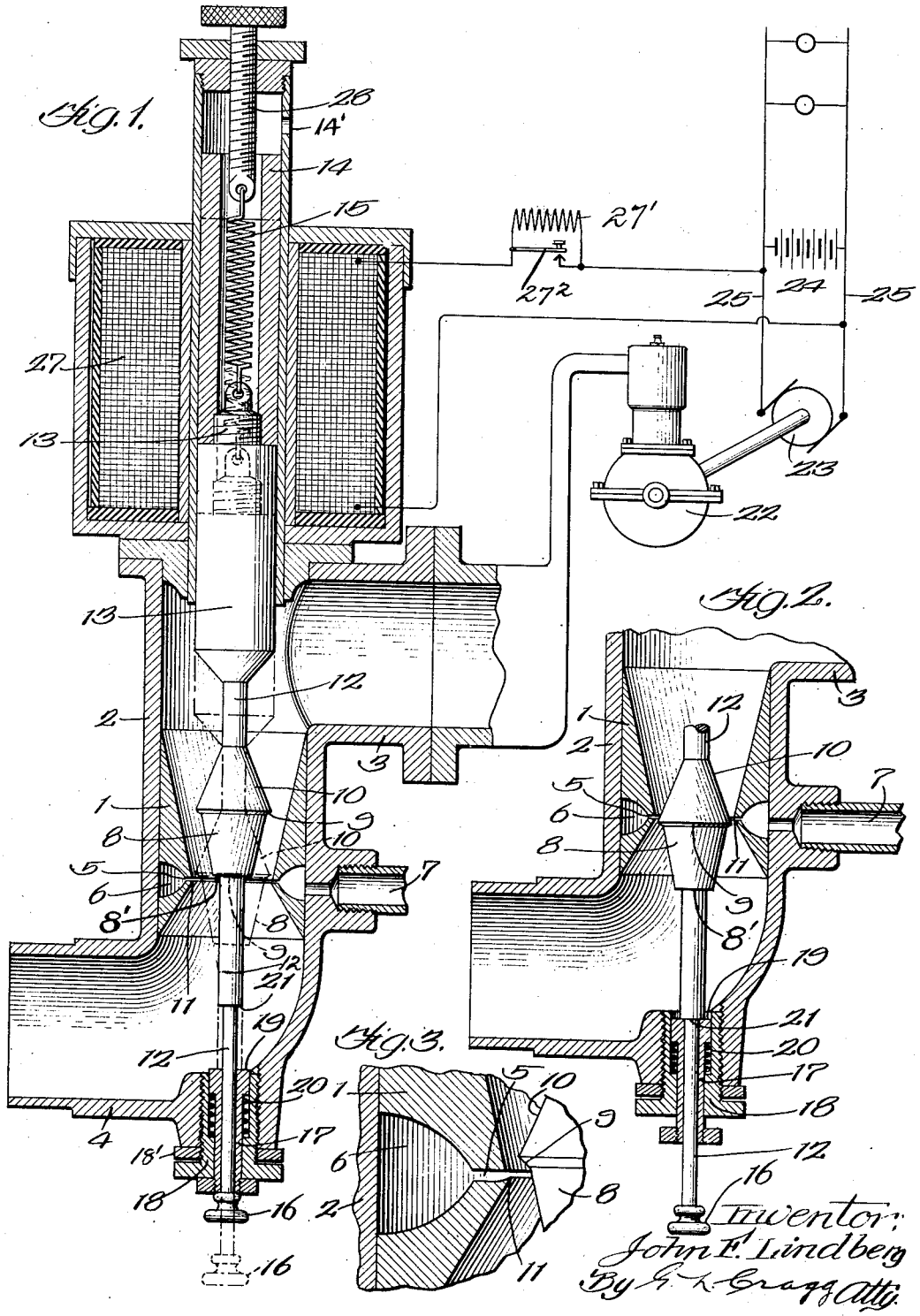

JOHN F. LINDBERG, OF CHICAGO, ILLINOIS.

GOVERNING MECHANISM FOR INTERNAL-COMBUSTION ENGINES.

1,427,485.  Specification of Letters Patent.  Patented Aug. 29, 1922.

Application filed October 25, 1920. Serial No. 419,495.

*To all whom it may concern:*

Be it known that I, JOHN F. LINDBERG, a citizen of the United States, residing at Chicago, in the county of Cook and State of Illinois, have invented a certain new and useful Improvement in Governing Mechanism for Internal-Combustion Engines, of which the following is a full, clear, concise, and exact description.

My invention relates to mechanism for automatically governing the operation of carburetors and is of particular service in connection with a storage battery charging plant in which the generator is driven by an internal combustion hydro-carbon engine. The carburetor governor of my invention is inclusive of an electro-magnet, preferably in the form of a solenoid, whose energization is governed by the load upon the engine. In the case of a storage battery charging plant, the coil of the solenoid is in bridge of the charging circuit, the solenoid operating to adjust a valve that governs the operation of the carburetor in a manner to initiate the carburation of air to start the engine and thereafter to regulate the carburation of air to bring the engine to operating speed and gradually to reduce the supply of carburetted air as the battery is being charged, the supply of carburetted air being nearly shut off when the battery is fully charged.

The carburetor governor of my invention may be employed in conjunction with carburetors of various designs, the governor being particularly applicable for use in conjunction with a form of carburetor illustrated in my co-pending application Serial No. 419,494 filed October 29, 1920.

The invention will be fully explained by reference to the accompanying drawing illustrating one embodiment thereof and in which Fig. 1 is a longitudinal sectional view of a carburetor and the governor in conjunction therewith, the connection of the engine with the carburetor being diagrammatically illustrated as is also the storage battery charging plant whose generator is driven by the engine; Fig. 2 is a sectional view illustrating some of the parts that are shown in Fig. 1 but in altered positions into which they are brought in priming; and Fig. 3 is an enlarged sectional view illustrating a detail of construction that is preferably employed.

Like parts are indicated by similar characters of reference throughout the different figures.

The Venturi tube 1 is disposed within the straight portion 2 of piping whose ends 3 and 4 are shown as being angular to the portion 2, the end 3 being adapted for connection with the intake manifold of the engine and the end 4 being in communication with the external air. There is provided an inlet 5 which desirably surrounds the bore of the Venturi tube and is enlarged as indicated at 6 in order to have full communication with the liquid fuel inlet pipe 7 which may be provided with a controlling valve, not shown, for regulating the amount of liquid fuel admitted to the carburetor. By the arrangement illustrated the suction of the engine causes the admission of liquid fuel into the Venturi passage throughout the circle of the narrow portion of the bore of the Venturi tube. The air valve 8 tapers in a direction opposite to the direction in which the air flows through the piping. In the normal range of operations of this valve it extends upon both sides of the discharge end of the liquid fuel inlet opening 5, the valve occupying approximately the position shown by dotted lines in Fig. 1 when the engine is idling and the position illustrated in full lines when the engine is in normal operation. When the engine is to be started the air valve is drawn to the priming position shown in Fig. 2 to cause the partial vacuum created by the engine to be applied directly to the fuel discharge opening to draw in fuel in an abnormal quantity sufficient to prime the engine. When the engine has been started the base flange 9 of the valve is at once elevated above the discharge end of the liquid fuel inlet, the working position of the valve depending upon the speed or power required. In these positions of the air valve, the flow of liquid fuel does not depend directly upon the engine vacuum but upon the partial vacuum formed by the action due to the velocity of the air passing the discharge end of the liquid fuel inlet, the velocity of the air increasing as the valve rises. The base of the valve is preferably provided with the flange formation 9 which takes part in preventing the air that passes inwardly beyond the valve from attaining too high velocity while passing the liquid fuel opening and carrying with it too much liquid fuel. The depth of this shoulder is determined by the amount of liquid fuel necessary to properly carburet the air passing during the low or idling speed of the engine. The deeper the shoulder, the greater will be the opening area between the valve and the liquid fuel inlet, causing correspondingly slower velocity of the air passing said inlet. More specifically, the annular space between the valve base flange 9 and the portion of the Venturi opening in the plane of this flange controls and defines the engine suction, this space obviously increasing as the valve rises to occasion corresponding increase in engine suction in the space above the liquid fuel inlet. The velocity of the air that is effected by the engine suction is controlled by the area of the annular space between the edge 11 of the liquid fuel inlet and the part of the valve 8 in the plane of this inlet edge, this area increasing as the valve rises. The engine suction area at 9 increases faster than the velocity control area at 11 (as the valve rises) with the consequence that there is a differential action between the engine suction area at 9 and the velocity control area at 11 that causes increasing velocity and volume of the flowing air and increasing partial vacuum in the liquid fuel inlet to supply liquid fuel to the flowing air in proportion to its increasing velocity and volume. Further to prevent undue concentration of the air and undesirable swirling thereof toward the axis of the valve, there is provided a conical or tapering formation 10 converging in the direction in which the air is passing through the carburetor and having the flange 9 for its base. The side 11 of the discharge end of the inlet opening 5 that is first encountered by the air that is undergoing carburation is nearer the axis of the Venturi tube than the opposite side of the discharge end whereby the air is jetted, by its velocity, over the discharge end of the liquid fuel inlet to prevent the side 11 of the discharge end of the inlet which is last encountered by the air from swirling the air into such inlet; since the inlet should be limited to the flow therein of incoming liquid fuel. A partial vacuum is also created in the inlet, due to the velocity of the air and this vacuum increases as the air valve 8 moves upwardly, this upward movement of the air valve causing increasing velocity of the air. The increasing vacuum in the inlet, obviously, results in increasing pressure upon and inward feeding flow of the liquid fuel, this increasing flow of fuel accompanying and being due to the increasing pressure and flow of air.

The upper end of the valve stem 12 is formed in two sections 13 and 14 that are in fixed relation, section 13 being of brass and section 14 iron. A strong coiled spring 15 exerts opening action upon the valve. The lower end of the valve stem terminates in a knob or button 16 that is located upon the exterior of the carburetor whereby the valve may be manually adjusted to bring the valve 8 and its flange portion 9 to a position between the air and liquid fuel inlet 4, 5 for the purpose of priming the engine in starting. The lower end of the valve stem may pass through a guide 17, which guide, in turn, is within another guide 18. This latter guide has a head 19 that constitutes an abutment for one end of the coiled spring 20, the other end of this coiled spring being provided with an abutment that is formed within the bore of the guide 18. The springs normally define a limit for the downward movement of the air valve which is shown by dotted lines in Fig. 1. When the engine is to be primed the shoulder portion 21 of the valve stem is drawn against the inner face of the head 19 of the guide 17, which guide thereupon may be caused to slide outwardly within the bore of the guide 18 whereby the air valve and its flange portion 9 may be drawn to a position between the inlet 5 and the air inlet 4 so that the engine may pump liquid fuel into its cylinder. In this priming adjustment the valve will be drawn downwardly against the force of the springs and when the knob 16 is released the springs will serve to move the valve upwardly from its priming adjustment, the spring 20 finally re-establishing the normal position of the abutment face 19. In calibration, the normal position of the abutment 19 is determined by longitudinally adjusting the guide 18 which is, for this purpose, threaded into the carburetor casing. The adjustment of the guide 18 is fixed by the lock nut 18'.

The portion of the carburetor structure thus far specifically described in connection with the drawing forms the subject matter of my aforesaid co-pending application. In the present case I have diagrammatically indicated an internal combustion hydro-carbon engine 22 in connection with the branch 3 of the carburetor piping. A direct current electric generator 23 is illustrated as being driven by the engine. A storage battery 24 is connected between the sides of the generator circuit 25 to be in parallel with the generator to co-operate therewith in supplying translating devices with current when the generator is in operation and serving alone to supply the translating devices with current when the battery is fully or sufficiently charged. I have illustrated incandescent lamps 26 in bridge of the charging circuit.

The governor of my invention includes an electro-magnet that is preferably in the form of a solenoid whose energizing coil 27 is in bridge of the storage battery charging circuit. The portions 13 and 14 and the spring 15 of the air valve of the carburetor are disposed within the bore of the solenoid. The spring 15 has an adjustable anchorage 28 connected with a fixed portion of the structure. This spring serves to pull upon the valve structure in a valve opening direction, being capable of opening the valve to its widest position when the solenoid is not sufficiently energized to counteract this action of the spring. The section 14 serves as the core of the solenoid and is preferably made hollow to house the spring 15 which is connected at its inner end with the outer end of the stem section 13. This latter stem section is preferably made of brass or other non-magnetic material so as not to constitute a magnetic part of the solenoid core. The spring, when free to act fully, places the air valve in a wide open position in which the geometrical center of the magnetic portion 14 of the stem is above the geometrical center of the solenoid coil 27. When this coil becomes sufficiently energized it will pull upon the portion 14 of the stem, which thus constitutes the core of the solenoid, to move the stem inwardly to bring the valve toward its closed position. When the coil of the solenoid is fully energized the core 14 thereof will be pulled sufficiently inward to bring the valve substantially to a closed position. The spring and the solenoid thus co-operate to position the valve according to the requirements of the engine, the spring having a valve opening tendency and the solenoid a valve closing tendency.

Assuming that the battery is a thirty-two volt battery, the spring will operate to open the valve widely when its voltage lowers to twenty-eight volts and the solenoid will serve to bring the valve substantially to a closed position when the battery is fully charged. As the battery is being charged, the movement of the valve from its wide open position to its fully closed position will be gradually effected so that the charging of the battery will be smoothly accomplished, the movement of the valve from the one position to the other being gradually effected to cause a corresponding change in the speed of the engine.

The cylindrical plunger or piston portion 13 of the valve stem is of a diameter slightly less than the diameter of the valve at its largest portion 9 for the purpose of balancing the action of the suction of the engine on the valve to eliminate severe chattering or pumping action, although slight pumping movement may be permitted to prevent the solenoid core portion of the valve stem from sticking. Air admitted through the opening 14' will exert a counterbalancing downward pressure on the piston 13—14 in proportion to the vacuum in the carburetor chamber below and in opposition to the upward pressure exerted by the air from below the valve.

The valve is of such short length that the spring 15 will move it entirely above the inlet opening when the solenoid is placed out of action—as in the event of breakage of the circuit wiring. When the valve is thus located the velocity of the air is so reduced as to prevent the indrawing of liquid fuel. This action of the valve is preferably made precipitate by having the valve overhang its stem at the shouldered formation 8' of the valve.

Resistance 27' is normally in the solenoid circuit. This resistance may be shunted by the switch 27² to increase the power of the solenoid to such an extent as to cause the depression of the valve to the primary position illustrated in Fig. 2.

While the governor of my invention is of particular service when employed in conjunction with an internal combustion hydrocarbon engine that drives the generator of a storage battery charging plant, I do not wish to be limited to the form of variable electrical load which is supplied with current by the engine driven generator, nor to the presence of other translating devices in the load circuit in addition to the controlling magnet therein.

While the governor of my invention desirably operates directly upon an air valve that serves to regulate the volume and velocity of air supplied to the carburetor and thereby the amount of gaseous fuel supplied to the engine to suit the load thereon, I do not wish to be limited to the operation of a valve that thus regulates the flow of air.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A carburetor having a Venturi tube formed with a liquid fuel inlet whose discharge end is at the narrow portion of the bore of said tube; and an air valve in the bore of the tube, and adjustable axially of the tube and into positions in which it is upon both sides of the discharge end of said liquid fuel inlet, in combination with an internal combustion hydro-carbon engine to which fuel is supplied through the carburetor; a generator of electricity driven by the engine; a load circuit supplied by the generator; and an electro-magnet connected with the load circuit and in closing relation to said valve.

2. A carburetor having a Venturi tube formed with a liquid fuel inlet whose discharge end is at the narrow portion of the bore of said tube; and an air valve in the bore of the tube tapering in a direction opposite the direction of the incoming air and adjustable axially of the tube and into positions in which it is upon both sides of the discharge end of said liquid fuel inlet, in combination with an internal combustion hydro-carbon engine in which fuel is supplied through the carburetor; a generator of electricity driven by the engine; a load circuit supplied by the generator; and an electro-magnet connected with the load circuit and in closing relation to said valve.

3. A carburetor having a Venturi tube formed with a liquid fuel inlet whose discharge end is at the narrow portion of the bore of said tube; and a conical air valve in the bore of the tube tapering in a direction opposite the direction of the incoming air and adjustable axially of the tube and into positions in which it is upon both sides of the discharge end of said liquid fuel inlet, the broader end of this valve having a flange formation; in combination with an internal combustion hydro-carbon engine in which fuel is supplied through the carburetor; a generator of electricity driven by the engine; a load circuit supplied by the generator; and an electro-magnet connected with the load circuit and in closing relation to said valve.

4. A carburetor having a Venturi tube formed with a liquid fuel inlet whose discharge end is at the narrow portion of the bore of said tube; and a conical air valve in the bore of the tube tapering in a direction opposite the direction of the incoming air and adjustable axially of the tube and into positions in which it is upon both sides of the discharge end of said liquid fuel inlet; in combination with an internal combustion hydro-carbon engine in which fuel is supplied through the carburetor; a generator of electricity driven by the engine; a load circuit supplied by the generator; and an electro-magnet connected with the load circuit and in closing relation to said valve.

5. A carburetor having a Venturi tube formed with a liquid fuel inlet whose discharge end is at the narrow portion of the bore of said tube; an air valve in the bore of the tube tapering in a direction opposite the direction of the incoming air and adjustable axially of the tube and into positions in which it is upon both sides of the discharge end of said liquid fuel inlet, the broader end of this valve having a flange formation; and a tapering formation whose base is said flange formation, in combination with an internal combustion hydro-carbon engine in which fuel is supplied through the carburetor; a generator of electricity driven by the engine; a load circuit supplied by the generator; and an electro-magnet connected with the load circuit and in closing relation to said valve.

6. A carburetor having a Venturi tube formed with a liquid fuel inlet whose discharge end is at the narrow portion of the bore of said tube; an air valve in the bore of the tube tapering in a direction opposite the direction of the incoming air and adjustable axially of the tube and into positions in which it is upon both sides of the discharge end of said liquid fuel inlet; and a tapering formation in symmetrical relation to said air valve whose base is joined with the base of the air valve, in combination with an internal combustion hydro-carbon engine in which fuel is supplied through the carburetor; a generator of electricity driven by the engine; a load circuit supplied by the generator; and an electro-magnet connected with the load circuit and in closing relation to said valve.

7. A carburetor having a Venturi tube formed with a liquid fuel inlet whose discharge end is at the narrow portion of the bore of said tube; and an air valve in the bore of the tube and adjustable axially of the tube, said air valve being adjustable to a position between the air and liquid fuel inlets for the purpose of priming, in combination with an internal combustion hydro-carbon engine in which fuel is supplied through the carburetor; a generator of electricity driven by the engine; a load circuit supplied by the generator; and an electro-magnet connected with the load circuit and in closing relation to said valve.

8. A carburetor having an air valve for regulating the supply of air to the carburetor, in combination with an internal combustion hydro-carbon engine in which fuel is supplied through the carburetor; a generator of electricity driven by the engine; a load circuit supplied by the generator, and an electro-magnet connected with the load circuit and in closing relation to said valve.

9. A carburetor having a valve for regulating the carburation of air, in combination with an internal combustion hydro-carbon engine in which fuel is supplied through the carburetor; a generator of electricity driven by the engine; a load circuit supplied by the generator; and an electro-magnet connected with the load circuit and in closing relation to said valve.

10. A carburetor having an air valve for regulating the supply of air to the carburetor, in combination with an internal combustion hydro-carbon engine in which fuel is supplied through the carburetor; a generator of electricity driven by the engine; a load circuit supplied by the generator; an electro-magnet connected with the load circuit and in closing relation to said valve; and means, operating when the electro-magnet is placed out of action, for adjusting the valve to a position in which the velocity of the air flowing through the carburetor is insufficient to cause material inflow of liquid fuel into the carburetor.

11. A carburetor having an air valve for regulating the supply of air to the carburetor, in combination with an internal combustion hydro-carbon engine in which fuel is supplied through the carburetor; a generator of electricity driven by the engine; a load circuit supplied by the generator; an electro-magnet connected with the load circuit and in closing relation to said valve, said valve being adjustable to position between the fuel and air inlets to permit the suction of the engine to draw liquid fuel into the carburetor for priming; and means for increasing the energization of the electro-magnet to cause the latter action of the valve.

12. A carburetor having an air valve for regulating the supply of air to the carburetor, in combination with an internal combustion hydro-carbon engine in which fuel is supplied through the carburetor; a generator of electricity driven by the engine; a load circuit supplied by the generator; an electro-magnet connected with the load circuit; and means, operating when the electro-magnet is placed out of action, for adjusting the valve to a position in which the velocity of the air flowing through the carburetor is insufficient to cause material inflow of liquid fuel into the carburetor.

13. A carburetor having an air valve for regulating the supply of air to the carburetor, in combination with an internal combustion hydro-carbon engine in which fuel is supplied through the carburetor; engine controlled means in controlling relation to the valve; and means operating when the engine controlled means is placed out of action, for adjusting the valve to a position in which the velocity of the air flowing through the carburetor is insufficient to cause material inflow of liquid fuel into the carburetor.

In witness whereof, I hereunto subscribe my name this 5th day of October A. D., 1920.

JOHN F. LINDBERG.